(12) United States Patent
Srinivasan et al.

(10) Patent No.: US 10,052,724 B2
(45) Date of Patent: Aug. 21, 2018

(54) BRAZE COMPOSITION, BRAZING PROCESS, AND BRAZED ARTICLE

(71) Applicant: GENERAL ELECTRIC COMPANY, Schenectady, NY (US)

(72) Inventors: Dheepa Srinivasan, Karnataka (IN); Dayananda Narayana, Karnataka (IN); Surinder Singh Pabla, Greer, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 15/058,342

(22) Filed: Mar. 2, 2016

(65) Prior Publication Data

US 2017/0252875 A1    Sep. 7, 2017

(51) Int. Cl.
*B23K 31/02*   (2006.01)
*B23K 35/30*   (2006.01)
(Continued)

(52) U.S. Cl.
CPC .......... *B23K 35/304* (2013.01); *B23K 1/0018* (2013.01); *B23K 35/025* (2013.01);
(Continued)

(58) Field of Classification Search
CPC .......................... B23K 35/304; B23K 35/025; B23K 35/3046; B23K 1/0018; C22C 19/05;
(Continued)

(56) References Cited

U.S. PATENT DOCUMENTS 3,741,791 A * 6/1973 Maxwell et al. ....... C23C 10/30
427/250
4,169,744 A * 10/1979 D'Silva ................ B23K 35/304
148/427

(Continued)

FOREIGN PATENT DOCUMENTS

EP        1029629 A2 *  2/2000
EP      1 172 460 A2    1/2002
(Continued)

OTHER PUBLICATIONS

"Cobalt [Nickel] Chromium Aluminum Yttrium (Co[Ni]CrAlY), Thermal Spray Powder Products," Material Product Data Sheet DSMTS-0092.6—CoNiCrAlY Powders oerlikon metco, pp. 1-4 (2015).

(Continued)

*Primary Examiner* — Kiley S Stoner
(74) *Attorney, Agent, or Firm* — McNees Wallace & Nurick LLC

(57) ABSTRACT

A braze composition, brazing process, and brazed article are disclosed. The braze composition includes a MCrAlY alloy at a concentration, by weight, of between 50% and 70%, where M is selected from the group consisting of nickel, cobalt, iron, alloys thereof, and combinations thereof, and a nickel-based alloy at a concentration, by weight, of between 30% and 50%. The brazing process includes forming a braze paste, brazing the braze paste to a portion of a component, and shaping the braze paste to form a brazed article. The brazed article includes a component and a braze composition brazed to the component, the braze composition including a MCrAlY alloy at a concentration, by weight, of between 50% and 70%, where M is selected from the group consisting of nickel, cobalt, iron, alloys thereof, and combinations (Continued)

thereof, and a nickel-based alloy at a concentration, by weight, of between 30% and 50%.

19 Claims, 4 Drawing Sheets

(51) Int. Cl.

| | | |
|---|---|---|
| *B23K 1/00* | (2006.01) | |
| *B23K 35/02* | (2006.01) | |
| *C22C 19/05* | (2006.01) | |
| *C22C 19/07* | (2006.01) | |
| *C22C 30/00* | (2006.01) | |
| *C23C 28/00* | (2006.01) | |
| *F01D 5/28* | (2006.01) | |

(52) U.S. Cl.
CPC .......... *B23K 35/3046* (2013.01); *C22C 19/05* (2013.01); *C22C 19/058* (2013.01); *C22C 19/07* (2013.01); *C22C 30/00* (2013.01); *C23C 28/00* (2013.01); *F01D 5/288* (2013.01)

(58) Field of Classification Search
CPC ....... C22C 30/00; C22C 19/07; C22C 19/058; F01D 5/288; C23C 28/00
USPC ............... 228/248.1, 248.5, 119; 148/23–24; 29/889.1–889.722
See application file for complete search history.

(56) References Cited

U.S. PATENT DOCUMENTS

| | | | | |
|---|---|---|---|---|
| 4,321,311 A * | 3/1982 | Strangman | C23C 14/024 | 428/623 |
| 4,655,857 A * | 4/1987 | Masumoto | C22C 19/058 | 148/423 |
| 5,246,661 A * | 9/1993 | Culling | C22C 30/00 | 420/101 |
| 5,271,547 A * | 12/1993 | Carlson | B23K 35/302 | 228/122.1 |
| 5,424,134 A * | 6/1995 | Dudel | B23K 35/0244 | 148/23 |
| 5,658,614 A * | 8/1997 | Basta | C23C 10/02 | 427/142 |
| 6,042,880 A * | 3/2000 | Rigney | C23C 10/60 | 427/142 |
| 6,103,186 A | 8/2000 | Sieverzs et al. | | |
| 6,203,754 B1 * | 3/2001 | Sugiyama | B23K 35/304 | 228/262.42 |
| 6,368,672 B1 * | 4/2002 | Thompson | C23C 4/02 | 427/452 |
| 6,387,541 B1 * | 5/2002 | Gray | C23C 28/00 | 428/472 |
| 6,434,823 B1 * | 8/2002 | Gupta | B23P 6/007 | 29/402.18 |
| 6,520,401 B1 * | 2/2003 | Miglietti | B23K 1/0018 | 228/194 |
| 6,589,600 B1 * | 7/2003 | Hasz | B22C 9/10 | 427/264 |
| 6,637,643 B2 * | 10/2003 | Hasz | B23K 35/0238 | 228/119 |
| 7,017,793 B2 * | 3/2006 | Kinstler | B23K 35/0244 | 228/119 |
| 7,094,450 B2 * | 8/2006 | Nagaraj | C23C 4/00 | 29/889.1 |
| 7,222,422 B2 * | 5/2007 | Gupta | B23K 1/0008 | 228/119 |
| 7,789,288 B1 * | 9/2010 | Johnson | B23K 1/0018 | 228/119 |
| 9,012,032 B1 * | 4/2015 | Jablonski | C23C 16/405 | 416/241 R |
| 9,193,011 B2 * | 11/2015 | Mars | B23K 35/0222 | |
| 9,561,556 B2 * | 2/2017 | Werner | F01D 5/288 | |
| 2002/0119338 A1 * | 8/2002 | Hasz | B23K 35/327 | 428/558 |
| 2002/0168537 A1 * | 11/2002 | Hasz | B32B 15/01 | 428/553 |
| 2002/0192494 A1 * | 12/2002 | Tzatzov | C23C 26/00 | 428/655 |
| 2003/0101587 A1 * | 6/2003 | Rigney | C23C 4/02 | 29/889.1 |
| 2003/0152705 A1 * | 8/2003 | Pfaendtner | C23C 24/08 | 427/376.1 |
| 2004/0124231 A1 * | 7/2004 | Hasz | B23K 35/3046 | 228/245 |
| 2004/0261914 A1 * | 12/2004 | Boucard | C23C 28/3215 | 148/518 |
| 2005/0235493 A1 * | 10/2005 | Philip | C23C 4/02 | 29/889.1 |
| 2007/0039177 A1 * | 2/2007 | Yoshioka | B23K 1/0018 | 29/889.1 |
| 2007/0224443 A1 * | 9/2007 | Torigoe | C23C 10/02 | 428/632 |
| 2009/0280023 A1 * | 11/2009 | Hu | B23K 1/0018 | 420/445 |
| 2010/0159130 A1 * | 6/2010 | Hasegawa | B22D 7/068 | 427/142 |
| 2010/0237134 A1 * | 9/2010 | Bucci | B22F 7/062 | 228/119 |
| 2011/0081480 A1 * | 4/2011 | Bucci | B23K 1/0018 | 427/142 |
| 2011/0088260 A1 * | 4/2011 | Yoshioka | B22F 7/062 | 29/888 |
| 2011/0103967 A1 * | 5/2011 | Hoebel | B23K 35/304 | 416/241 R |
| 2011/0154947 A1 | 6/2011 | Heinecke et al. | | |
| 2012/0048912 A1 * | 3/2012 | Hu | F01D 5/005 | 228/119 |
| 2012/0110847 A1 * | 5/2012 | Berkebile | B23K 1/0056 | 29/889.1 |
| 2013/0101828 A1 * | 4/2013 | Park | B23K 1/0018 | 428/323 |
| 2013/0272916 A1 * | 10/2013 | Richardson | F02C 7/30 | 420/435 |
| 2013/0316183 A1 * | 11/2013 | Kulkarni, Jr. | B23P 6/007 | 428/557 |
| 2015/0275687 A1 * | 10/2015 | Bruck | B23P 6/007 | 277/345 |
| 2016/0003064 A1 * | 1/2016 | Stratton | C22C 19/058 | 416/241 R |
| 2016/0069185 A1 * | 3/2016 | Stankowski | B23P 6/005 | 29/889.1 |

FOREIGN PATENT DOCUMENTS

| | | | |
|---|---|---|---|
| EP | 2423439 A2 * | 8/2011 | |
| JP | 01053796 A * | 3/1989 | |
| JP | H0822472 B2 * | 3/1996 | |
| WO | WO 2007069409 A1 * | 6/2007 | |

OTHER PUBLICATIONS

Extended European Search Report and Opinion issued in connection with corresponding EP Application No. 17158891.6 dated Jul. 11, 2017.

* cited by examiner

BRAZE COMPOSITION, BRAZING PROCESS, AND BRAZED ARTICLE

FIELD OF THE INVENTION

The present embodiments are directed to braze compositions, brazing processes, and brazed articles. More particularly, the present embodiments are directed to a braze paste and a process of forming a brazed article with the braze paste.

BACKGROUND OF THE INVENTION

Gas turbines include components, such as buckets (blades), nozzles (vanes), combustors, shrouds, and other hot gas path components which are coated with a thermal barrier coating to protect the components from the extreme temperatures, chemical environments and physical conditions found within the gas turbines. A bond coating may be applied between the component and the thermal barrier coating, said bond coating increasing the bond strength of the thermal barrier coating to the component and offering additional protection. Such bond coatings are often applied during the manufacturing process of the gas turbine component.

However, many gas turbine components are modified at some point during their life cycle. For example, some components are modified to adjust shape and/or geometry prior to being placed in service. Other components may be modified after having been placed in service to replace materials and/or change the geometry of the component. In many instances, this modification of the components includes joining or adding material, which is usually preceded by the removal of the bond coating and/or thermal barrier coating and then followed by re-coating.

The removing and re-coating of the bond coating and/or thermal barrier coating, such as, for example, through stripping with an acid, extends the duration of the modification period for the component. Additionally, the stripping and re-coating increases the cost of modification, typically accounting for more than 30 to 40% of the modification cost. Thus, there would be considerable cost and time saving potential in avoiding stripping and re-coating.

BRIEF DESCRIPTION OF THE INVENTION

In an exemplary embodiment, a braze composition includes a MCrAlY alloy at a concentration, by weight, of between 50% and 70%, where M is selected from the group consisting of nickel, cobalt, iron, alloys thereof, and combinations thereof, and a nickel-based alloy at a concentration, by weight, of between 30% and 50%.

In another exemplary embodiment, a brazing process includes forming a braze paste, brazing the braze paste to a portion of a component, and shaping the braze paste to form a brazed article. The braze paste includes a MCrAlY alloy at a concentration, by weight, of between 50% and 70%, where M is selected from the group consisting of nickel, cobalt, iron, alloys thereof, and combinations thereof, and a nickel-based alloy at a concentration, by weight, of between 30% and 50%.

In another exemplary embodiment, brazed article includes a component including a service returned coating deposited thereon and a braze composition brazed to the component, the braze composition including a MCrAlY alloy at a concentration, by weight, of between 50% and 70%, where M is selected from the group consisting of nickel, cobalt, iron, alloys thereof, and combinations thereof, and a nickel-based alloy at a concentration, by weight, of between 30% and 50%.

In another exemplary embodiment, a brazed article was overlaid on a blade without stripping and recoating an existing bond coating.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary braze compositions, brazing processes, and brazed articles. Embodiments of the present disclosure, in comparison to processes and articles not using one or more of the features described herein, provide a process for simultaneously joining and coating an article, decrease braze processing time, decrease braze processing cost, decrease or eliminate stripping of existing coatings from components before brazing, decrease or eliminate re-coating of components after brazing, permit brazing without removing existing component coatings, provide service-ready components without subsequent coating, provide a braze composition that increases oxidation protection without applying additional coatings, increase component life cycle, or a combination thereof. The embodiment disclosed herein may be used for a variety of different purposes, including, but not limited to, gas turbine stage 1 blade tip repair, in conjunction with an overlay MCrAlY oxidation coating after service exposure, which increases performance and life cycle of the blade upon return to service.

Figure 1:
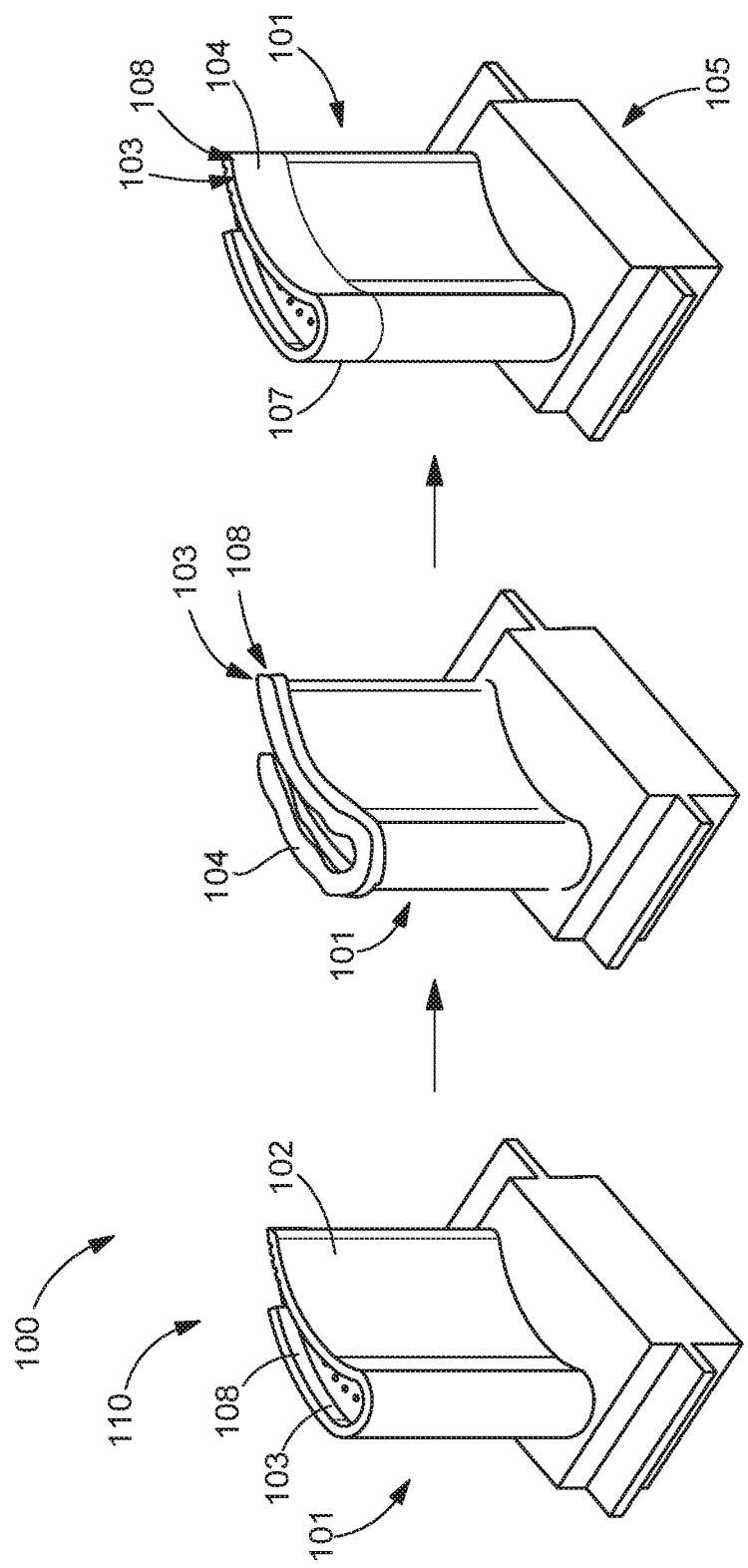
FIG. 1 is a perspective view of a component during a brazing process, according to an embodiment of the disclosure.

Referring to FIG. 1, in one embodiment, a brazing process 100 includes a manufacturing process 110. In another embodiment, the manufacturing process 110 includes applying a braze composition 104 to a portion 103 of a component 101, and then shaping the braze composition 104 on the component 101. In a further embodiment, prior to the applying of the braze composition 104, the manufacturing process includes preparing the component 101, such as, for example, by forming, cleaning, coating, and/or positioning the component 101. Additionally or alternatively, according to one or more of the embodiments disclosed herein, the component 101 includes a service returned coating that remains on the component 101 during and after the brazing process 100.

The applying of the braze composition 104 includes any suitable method for securing the braze composition 104 to the component 101 to form a brazed article 105. Suitable methods for applying the braze composition 104 include, but are not limited to, brazing, welding, sintering, or a combination thereof. For example, in one embodiment, the applying of the braze composition 104 includes brazing of the braze composition 104 to the portion 103 of the component 101. The brazing secures the braze composition 104 to the component 101 to form the brazed article 105.

The shaping of the braze composition 104 includes any suitable method for modifying a shape of the braze composition 104 to form a coating 107 having a desired geometry. As used herein, the term "desired geometry" refers to a final shape of the coating 107 that matches the portion 103 of the component 101 over which the braze composition 104 is applied. Suitable methods for shaping of the braze composition 104 include, but are not limited to, machining, drilling, honing, or a combination thereof. For example, the shaping of the braze composition 104 may include machining of the braze composition 104 to remove excess material and/or modify the surface contour of the coating 107 formed by the braze composition 104.

As will be understood by those skilled in the art, the desired geometry of the coating 107 will depend upon the shape and/or geometry of the component 101 as well as the shape and/or geometry of the portion 103 over which the braze composition 104 is applied. In one embodiment, the component 101 includes any suitable gas turbine component, such as, but not limited to, a turbine bucket 102, a turbine blade, a nozzle (vane), a combustor, a shroud, any other hot gas path component, or a combination thereof In another embodiment, the portion 103 includes any suitable portion of the component 101, such as, but not limited to, a squealer tip 108, a base portion, a dovetail portion, an airfoil portion, or a combination thereof. For example, in a further embodiment, the coating 107 is formed over the squealer tip 108 of a stage 1 turbine bucket 102.

Figure 2:
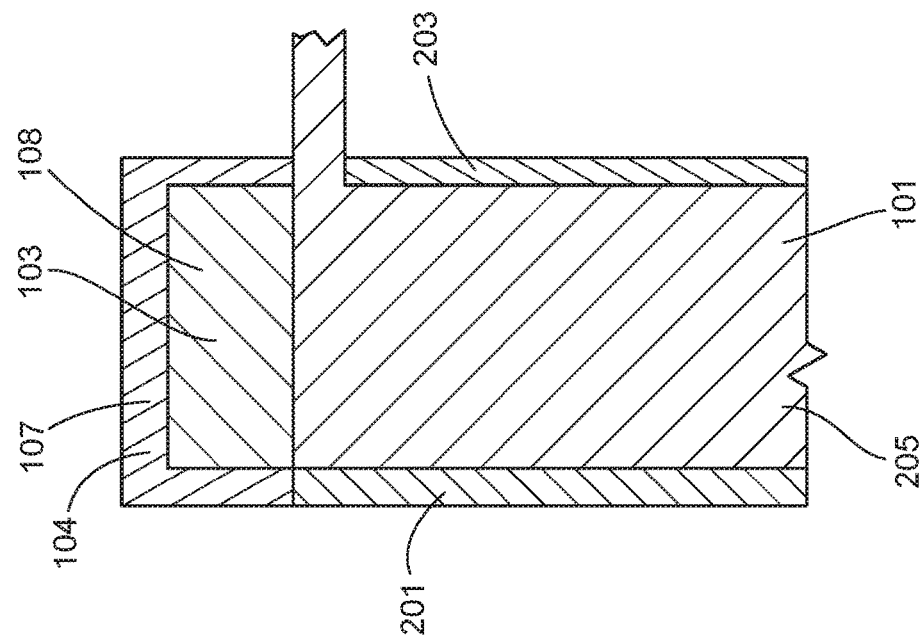
FIG. 2 is a section view of a portion of the component during the brazing process of FIG. 1, according to an embodiment of the disclosure.
Figure 2:
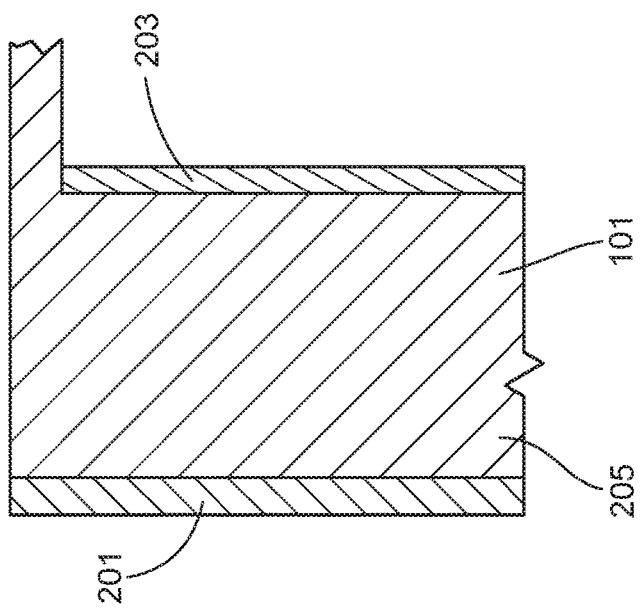

Turning to FIG. 2, in one embodiment, the component 101 includes an outer coating 201 and/or an inner coating 203 formed over a surface thereof. The outer coating 201 and/or the inner coating 203 are arranged and disposed to provide the component 101 with one or more predetermined properties. For example, the outer coating 201 may include an oxidation resistant coating that decreases or eliminates oxidation of a base material 205 of the component 101. In contrast to current brazing methods, where the outer coating 201 and/or the inner coating 203 of the component 101 are removed prior to brazing, the brazing process 100 includes applying the braze composition 104 to the portion 103 without first stripping or otherwise removing the outer coating 201 and/or the inner coating 203. Additionally, the brazing process 100 provides a joining operation that restores diminished portions of the base material 205 and simultaneously forms and/or replaces the outer coating 201 and/or the inner coating 203 with the same, substantially the same, or different coating, without first stripping or otherwise removing the existing outer coating 201 and/or the existing inner coating 203. This applying of the braze composition 104 without first stripping or removing the outer coating 201 and/or the inner coating 203 decreases or eliminates re-coating of the component 101, decreases processing time for the manufacturing process 110, decreases manufacturing cost, increases manufacturing efficiency, or a combination thereof.

Figure 3:
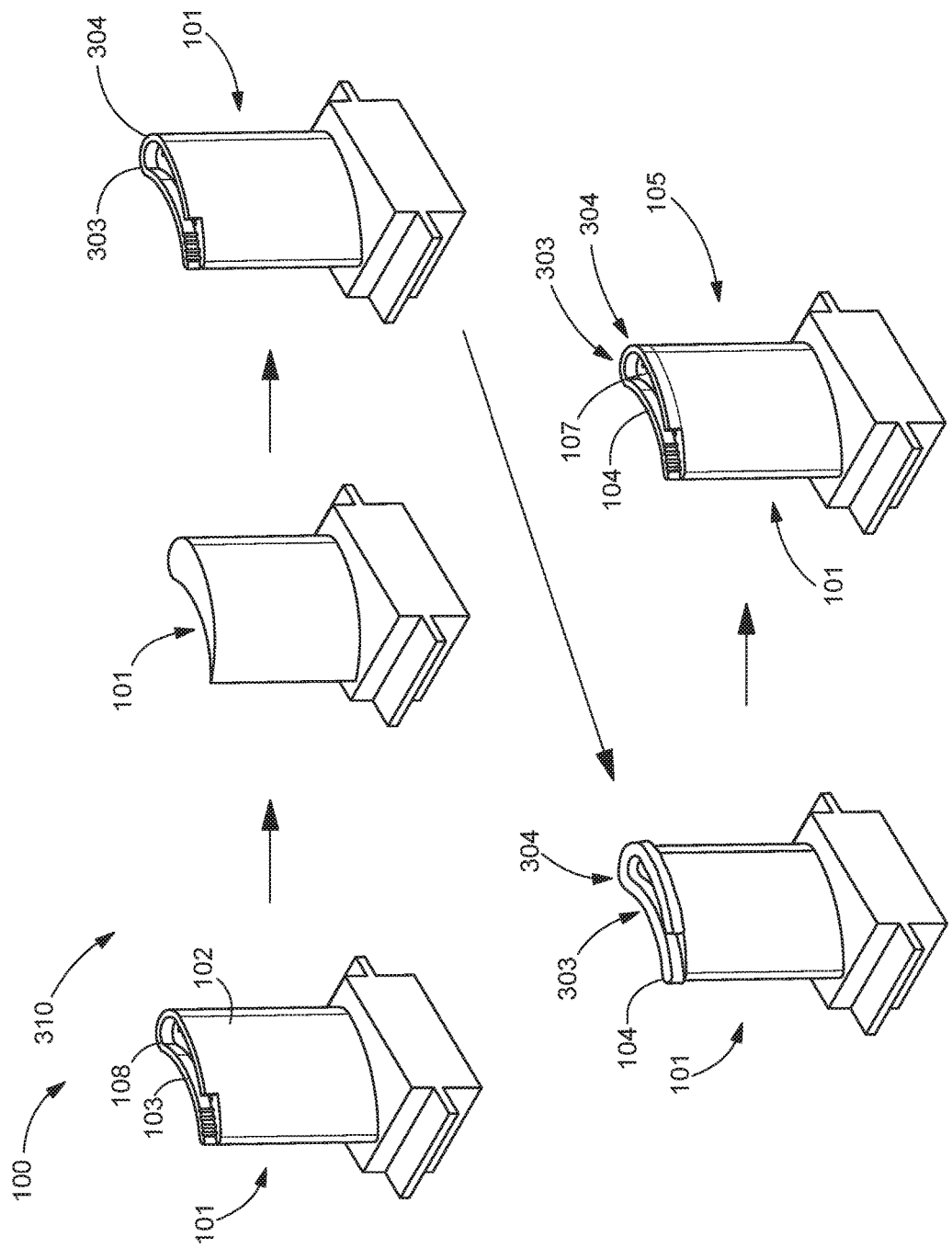
FIG. 3 is a perspective view of a component during a brazing process, according to an embodiment of the disclosure.

In certain embodiments, as illustrated in FIG. 3, the brazing process 100 includes a modification process 310. In one embodiment, the modification process 310 includes removing the portion 103 of the component 101, replacing the portion 103 of the component with a modified portion 303, applying the braze composition 104 to the modified portion 303, and then shaping the braze composition 104 on the modified portion 303 to form the coating 107 having the desired geometry. For example, in another embodiment, the modification process 103 includes removing the squealer tip 108 from the component 101, welding the component 101 to form a replacement squealer tip 304 on the component 101, applying the braze composition 104 to the replacement squealer tip 304, and then shaping the braze composition 104 to form the coating 107 over the replacement squealer tip 304.

Alternatively, the modification process 310 may include adding material to the portion 103 of the component 101, without first removing the portion 103 of the component 101. In one embodiment, the adding of the material changes the geometry of the portion 103 to form the modified portion 303. In another embodiment, the adding of the material includes forming the modified portion 303 through replacing a lost material of the portion 103. For example, maintenance and/or repair of the turbine bucket 102 may include tip buildup of the squealer tip 108, during which a material is added to the squealer tip 108 through welding, brazing, sintering, any other method of adding material, or a combination thereof. The material added to the squealer tip 108 replaces material lost during operation and/or changes the geometry of the squealer tip 108 for any other suitable purpose. After the tip buildup, the braze composition 104 is applied to the squealer tip 108 and then shaped to form the coating 107 over the modified portion 303.

Figure 4:
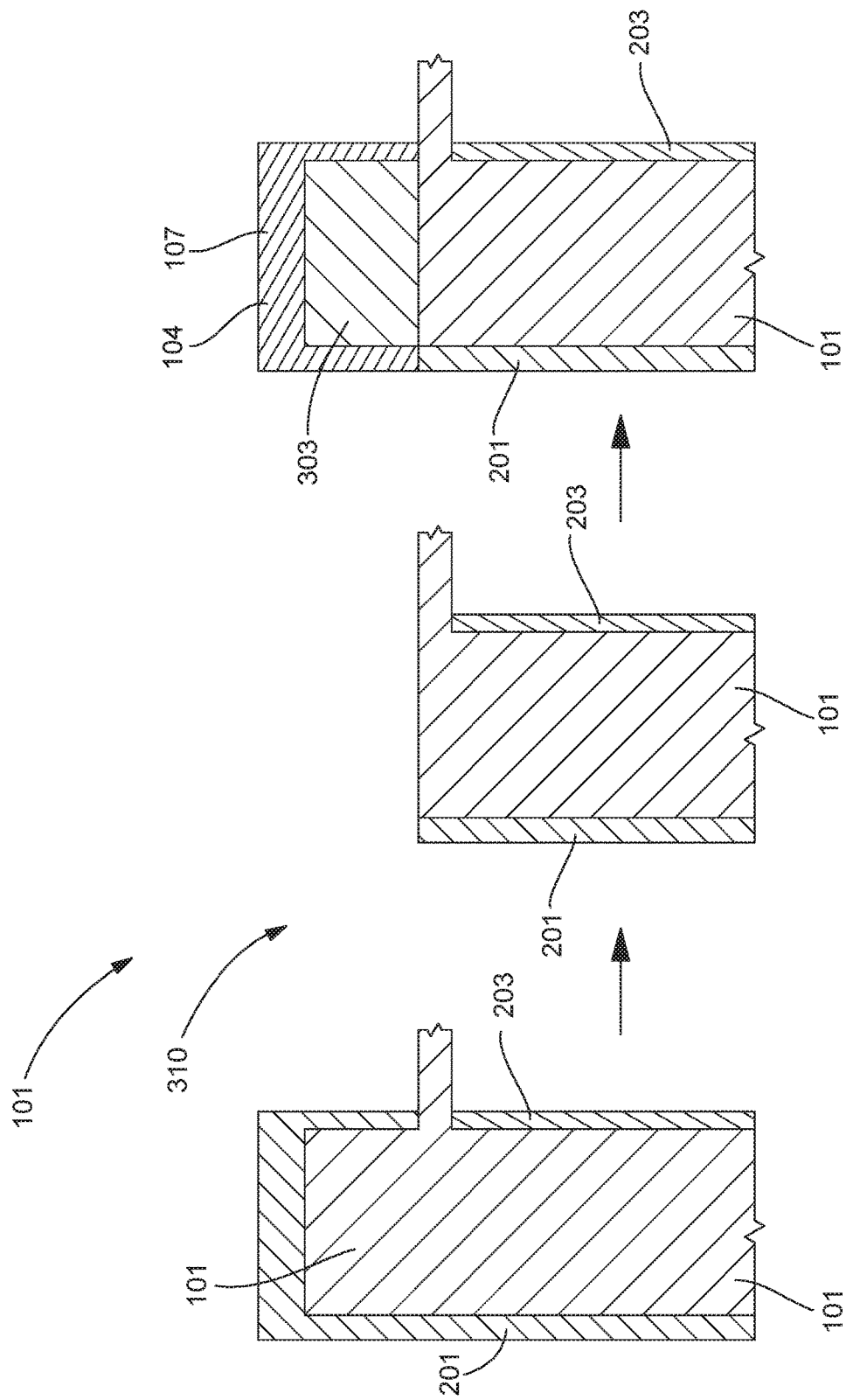
FIG. 4 is a section view of a portion of the component during the brazing process of FIG. 3, according to an embodiment of the disclosure.

Referring to FIG. 4, in one embodiment, prior to beginning the modification process 310, the component 101 includes any new or used component having the outer coating 201 and/or the inner coating 203 formed over a surface thereof. In another embodiment, the modified portion 303 formed during the modification process 310 is devoid of the outer coating 201 and/or the inner coating 203. In a further embodiment, the coating 107 formed by the braze composition 104 provides the outer coating 201 and/or the inner coating 203 over the modified portion 303.

The coating 107 is formed over the modified portion 303 without removing the outer coating 201 and/or the inner coating 203 from the rest of the component 101. By forming the coating 107 without removing the outer coating 201 and/or the inner coating 203, the modification process 310 decreases or eliminates re-coating of the component 101, decreases processing time for the manufacturing process 110, decreases manufacturing cost, increases manufacturing efficiency, or a combination thereof. Additionally, the coating 107 formed during the modification process 310 may provide one or more desired properties as compared to the outer coating 201 and/or the inner coating 203. Desired properties of the coating 107, as compared to the outer coating 201 and/or the inner coating 203, include, but are not limited to, increased life cycle, increased temperature performance, increased oxidation performance, increased abrasion performance, or a combination thereof.

According to one or more of the embodiments disclosed herein, the braze composition 104 includes a combination of a first alloy and a second alloy. The first alloy is present in the braze composition 104 at a concentration, by weight, of between 50% and 70%. The second alloy is present in the braze composition 104 at a concentration, by weight, of between 30% and 50%. When combined, the first alloy and the second alloy of the braze composition 104 form any suitable type of material, such as, but not limited to, a braze paste, a braze tape, a presintered preform, or a combination thereof.

A braze temperature of the braze composition 104 is dependent upon the concentration and/or composition of the first alloy and the second alloy, and includes any suitable brazing temperature based upon the material of the component 101 and/or the portion 103 of the component 101 over which the braze composition 104 is applied. Suitable brazing temperatures for the braze composition 104 include any temperature at or above which the braze composition 104 is brazed to the component 101, such as, but not limited to, at least 2000° F., at least 2100° F., at least 2150° F., at least 2175° F., between 2000° F. and 2500° F., between 2100° F. and 2350° F., between 2150° F. and 2250° F., between 2175° F. and 2250° F., or any combination, sub-combination, range, or sub-range thereof.

In one embodiment, the first alloy is similar or substantially similar to the outer coating 201 of the component 101. In another embodiment, the first alloy is different from the outer coating 201 of the component 101. In a further embodiment, the first alloy includes, but is not limited to, a high melt alloy, such as a MCrAlY bond coat material, where M is nickel, cobalt, iron, alloys thereof, or combinations thereof. For example, suitable first alloys include, but are not limited to, NiCrAlY alloys, NiCoCrAlY alloys, CoCrAlY alloys, FeCrAlY alloys, or combinations thereof.

One suitable first alloy includes, by weight, between about 30% and about 35% nickel, between about 20% and about 25% chromium, between about 8% and about 12% aluminum, between about 0.1% and about 0.5% yttrium, and a balance cobalt and incidental impurities. Another suitable first alloy includes, by weight, 32% nickel, 21% chromium, 10% aluminum, 0.5% yttrium, and a balance cobalt and incidental impurities. Another suitable first alloy includes, by weight, 29% chromium, 16% aluminum, 1% yttrium, and a balance cobalt. As will be understood by those skilled in the art, the first alloy is not limited to the alloys described above and may include any other alloy suitable for providing the desired properties of the component 101.

The second alloy includes any low melt alloy suitable for use with the first alloy. For example, in one embodiment, the second alloy includes a brazing filler, such as a low melt nickel-based alloy. In another embodiment, the second alloy has a composition, by weight, of between about 68% and about 74% nickel, between about 17% and about 21% chromium, and between about 8% and about 12% silicon. In a further embodiment, the second alloy has a composition, by weight, of 71% nickel, 19% chromium, and 10% silicon.

Together, the first alloy and the second alloy permit application of the braze composition 104 directly over the portion 103 and/or the modified portion 303, without removing any outer coating 201 and/or inner coating 203 deposited over the remainder of the component 101. Additionally, as described above, the braze composition 104 including the first alloy and the second alloy provides one or more desired properties to the coating 107 formed over the portion 103 and/or the modified portion 303.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brazing process, comprising:
   forming a braze paste from a braze composition including:
      a MCrAlY alloy at a concentration, by weight, of between 50% and 70%, where M is selected from the group consisting of nickel, cobalt, iron, alloys thereof, and combinations thereof; and
      a nickel-based alloy at a concentration, by weight, of between 30% and 50%;
   brazing the braze paste to a portion of a component, the component comprising a service-returned coating, to form a brazed composition on the portion of the component; then
   shaping the brazed composition on the component to form a brazed article; and then
   returning the component to service;
   wherein the service-returned coating is present on the component during the brazing;
   wherein the brazing process occurs without stripping or otherwise removing any of the service-returned coating on the component; and
   wherein the brazing process occurs without re-coating the service-returned coating of the component.

2. The brazing process of claim 1, wherein the brazing and the shaping form a repair process.

3. The brazing process of claim 1, wherein the brazing and the shaping form a manufacture process.

4. The brazing process of claim 1, wherein the component is a gas turbine component.

5. The brazing process of claim 1, wherein the brazing is performed at a temperature of between about 2175° F. and about 2250° F.

6. The brazing process of claim 1, wherein the service-returned coating is selected from the group consisting of a bond coating, a thermal barrier coating, and a combination thereof.

7. The brazing process of claim 1, wherein the MCrAlY alloy has a composition, by weight, of between about 30% and about 35% nickel, between about 20% and about 25% chromium, between about 8% and about 12% aluminum, between about 0.1% and about 0.5% yttrium, and a balance cobalt and incidental impurities.

8. The brazing process of claim 1, wherein the nickel-based alloy has a composition, by weight, of between about 68% and about 74% nickel, between about 17% and about 21% chromium, and between about 8% and about 12% silicon.

9. The brazing process of claim 8, wherein the nickel-based alloy has a composition, by weight, of 71% nickel, 19% chromium, and 10% silicon.

10. The brazing process of claim 1, wherein the component is a gas turbine component.

11. The brazing process of claim 10, wherein the gas turbine component is a turbine bucket.

12. The brazing process of claim 10, wherein the brazed composition forms a squealer tip on the component.

13. The brazing process of claim 10, wherein the gas turbine component is a hot gas path component.

14. The brazing process of claim 10, wherein the gas turbine component is a stage 1 turbine bucket.

15. The brazing process of claim 10, wherein the portion is selected from the group consisting of a squealer tip, a base, a dovetail, and an airfoil.

16. The brazing process of claim 1, wherein the shaping comprises machining the brazed composition.

17. The brazing process of claim 1 further comprising adding material to the portion of the component prior to the brazing.

18. The brazing process of claim 1, wherein the MCrAlY alloy has a composition, by weight, of 29% chromium, 16% aluminum, 1% yttrium, and a balance cobalt.

19. A brazing process, comprising:
  forming a braze paste from a braze composition including:
    a MCrAlY alloy at a concentration, by weight, of between 50% and 70%, where M is selected from the group consisting of nickel, cobalt, iron, alloys thereof, and combinations thereof; and
    a nickel-based alloy at a concentration, by weight, of between 30% and 50%;
  brazing the braze paste to a portion of a component, the component comprising a service-returned coating, to form a brazed composition on the portion of the component; then
  shaping the brazed composition on the component to form a brazed article; and then
  returning the component to service;
  wherein the service-returned coating is present on the component during the brazing;
  wherein the service-returned coating is selected from the group consisting of a bond coating, a thermal barrier coating, and a combination thereof;
  wherein the brazing process occurs without stripping or otherwise removing the service-returned coating on the component; and
  wherein the brazing process occurs without re-coating the service-returned coating of the component.

* * * * *